(12) United States Patent
Johansson et al.

(10) Patent No.: US 8,175,278 B2
(45) Date of Patent: May 8, 2012

(54) KEY MANAGEMENT MESSAGES FOR SECURE BROADCAST

(75) Inventors: Mattias Johansson, Johanneshov (SE); Fredrik Lindholm, Alvsjo (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1280 days.

(21) Appl. No.: 11/568,648

(22) PCT Filed: May 12, 2004

(86) PCT No.: PCT/SE2004/000739
§ 371 (c)(1),
(2), (4) Date: Nov. 3, 2006

(87) PCT Pub. No.: WO2005/109735
PCT Pub. Date: Nov. 17, 2005

(65) Prior Publication Data
US 2008/0013733 A1    Jan. 17, 2008

(51) Int. Cl.
*G06F 21/00* (2006.01)
(52) U.S. Cl. ........ 380/278; 713/158; 713/163; 713/176; 726/3; 380/281
(58) Field of Classification Search .................... 380/278
See application file for complete search history.

(56) References Cited

U.S. PATENT DOCUMENTS

| | | | | |
|---|---|---|---|---|
| 5,036,518 A | * | 7/1991 | Tseung | 714/748 |
| 5,748,736 A | | 5/1998 | Mittra | |
| 6,049,878 A | * | 4/2000 | Caronni et al. | 726/3 |
| 6,901,510 B1 | * | 5/2005 | Srivastava | 713/163 |
| 6,911,974 B2 | | 6/2005 | Asano et al. | |
| 7,454,518 B1 | * | 11/2008 | Cain et al. | 709/238 |

(Continued)

FOREIGN PATENT DOCUMENTS

WO    WO 0103364 A1    1/2001

(Continued)

OTHER PUBLICATIONS http://www.google.com/url?sa=t&source=web&cd=10
&ved=0CFkQFjAJ&url=http%3A%2Fciteseerx.ist.psu.
edu%2Fviewdoc%2Fdownload%3Fdoi%3D10.1.1.57.3249%26rep
%3Drep1%26type%3Dpdf&rct=j&q=%20Group%20Key%
20Management%20Protocol%20(GKMP)%20Architecture
&ei=RVnITbO2A-bg0QGUq6iiBw
&usg=AFQjCNF8ZKvxrPSa8GMF-2ZOk_jHic2XZA
&sig2=BwvYMu8jygMI34yBaOruLQ.*

(Continued)

*Primary Examiner* — Taghi Arani
*Assistant Examiner* — Mahfuzur Rahman
(74) *Attorney, Agent, or Firm* — Roger S. Burleigh

(57) ABSTRACT

The present invention involves establishing a top-level key and optionally also a verification tag. The top-level key is used as the MDP key for encrypting a broadcast medium. Only the part of the key message that contains the encrypted top-level key is authenticated, e.g. using a signature or a Message Access Code (MAC). Any known group-key distribution protocol can be used that is based on the creation of a hierarchy of keys. Examples of such methods are the LKH and SD methods. The group-key distribution protocol output key H, traditionally used as the MDP key, or a derivative thereof is used to encrypt the top-level MDP-key. The invention, further, includes optimization of a group-key message by eliminating unnecessary message components relative a specified group or sub-group of users. The optimization can be made in dependence of contextual data such as user profile, network status, or operator policies.

26 Claims, 12 Drawing Sheets

U.S. PATENT DOCUMENTS

| | | | | |
|---|---|---|---|---|
| 2002/0147906 | A1* | 10/2002 | Lotspiech et al. | 713/158 |
| 2003/0061481 | A1* | 3/2003 | Levine et al. | 713/163 |
| 2006/0059347 | A1* | 3/2006 | Herz et al. | 713/176 |
| 2007/0110248 | A1* | 5/2007 | Li | 380/278 |

FOREIGN PATENT DOCUMENTS

| | | |
|---|---|---|
| WO | WO 0260116 A2 | 1/2002 |
| WO | WO 0225861 A1 | 3/2002 |

OTHER PUBLICATIONS

Group Key Management| Tom Dunigan and Cathy Cao| Sep. 1998 (Use This Version Since It Is on 1998).* http://tools.ietf.org/pdf/rfc2093.pdf| Group Key Management Protocol (GKMP) Specification| H. Harney & C. Muckenhirn| SPARTA, Inc.| Jul. 1997.* http://ieeexplore.ieee.org/stamp/stamp.jsp?tp=&arnumber=790485 | The VersaKey Framework:Versatile Group Key Management| Marcel Waldvogel, Germano Caronni, Member, IEEE, Dan Sun, Student Member, IEEE,Nathalie Weiler, Student Member, IEEE, and Bernhard Plattner, Member, IEEE| Sep. 1999.*

Nakano, Toshihisa et al. Key Management System for Digital Content Protection Proceedings of the 2001 Symposium on Cryptography and Information Security. Jan. 23, 2001. vol. I of II. pp. 213-218.

Menezes, Alfred et al. Handbook of Applied Cryptography. CRC Press. 1996.

Wallner, D. Key Management for Multicast: Issue and Architectures. RFC 2627. 1999.

ProbabilisticOptimization of LKH-based Multicast Key Distribution Schemes, A. Selcuk et al. , Internet draft Jan. 2000, http://www.securemulticast.org/draft-selcuk-probabilistic-Ikh-OO.txt.

Secure Group Communications Using Key Graphs,C. K. Wong et al. http://www.cs.utexas.edu/users/Iam/Vita/ACM/WGL98.pdf.

A Reliable KeyAuthentication Scheme for Secure Multicast Communications, R. Di Pietro et al., http://cesare.dsi.uniromal.it/Sicurezza/doc/srds2003.pdf.

* cited by examiner

KEY MANAGEMENT MESSAGES FOR SECURE BROADCAST

TECHNICAL FIELD OF THE INVENTION

The present invention generally relates to distribution of key messages for derivation of a media key for decoding and authenticating secure broadcast and in particular to authentication and optimization of such messages.

BACKGROUND OF THE INVENTION

Broadcast and multicast enables efficient distribution of contents to large groups of receivers, as schematically illustrated in FIG. 1, for both wireless applications and standard data communications. In the following the term broadcast will be used to refer to both broadcast and multicast. Recent efforts focus broadcast over wireless networks and a key topic is to use the wireless link as efficiently as possible for example to reduce time for media access. Another topic of key interest is to provide secure broadcast. Thus, encryption of contents is an important enabler for commercial broadcast services. From a user point of view, authentication is an important topic. It is desirable that a user can verify that contents and encryption keys originate from an intended party.

Broadcast protection systems normally operate with a number of distinguished steps. A service registration step is usually required in which a user enters an agreement with a service provider. In this step the user is provided with a personal, unique and secret key. In a key-distribution step a media key is distributed to registered users for decryption of broadcast contents. The service provider encrypts the contents in a media delivery protection step. A re-key step is required to update the contents key, e.g. when a new user is registered, a user de-registers or when a media key is compromised. Periodic re-key may also be used to increase the security of the system. Service registration is usually point-to-point between a user and a content provider and may use any secure and authenticated means for communication. Key-distribution and media delivery protection (MDP) will be executed in a one-to-many fashion.

The main problem with key-distribution is to update the MDP-key when new members either join or leave the group in a way, which is scalable to large groups. The naive approach of sending the updated MDP-key encrypted individually for each member does not scale well. There are schemes proposed, referred to as group-key distribution protocols to improve scalability e.g. LKH (Logical Key Hierarchy), SD (Subset Difference) and LSD (Layered Subset Difference). These are examples of hierarchical group key distribution protocols.

To each hierarchical group key distribution protocol there is an associated set of encryption keys. An abstract hierarchical tree can be used in order to illustrate the arrangement of these keys and the relationship between the keys. FIG. 2 illustrates a hierarchical tree with a set of members, $M_1$ to $M_8$, at the bottom. At the top of the hierarchy there is the output key $K_m$ of the specific hierarchical protocol. A subgroup of the complete group of members determines a sub-tree of the hierarchical tree that in turn determines a group key management message comprising a set of identifiable message elements. The nodes in the tree model in between the bottom and top levels are associated with encryption keys required for decrypting elements of the group key management message. Each user receives, in an initiation phase, information for deriving a subset of these keys, e.g. all keys on the path between the particular member $M_i$ and the $K_m$. The hierarchical group key distribution protocols provide linear initial keying performance and improved logarithmic re-key performance. These methods are the most scalable and efficient ones because of the non-linear performance.

FIG. 2 can conveniently be used to discuss the LKH method. The LKH method is a scalable group-key distribution protocol, which is based on the approach of associating every node (i) in a tree with a key $K_i$ where (i) is an index in one or several dimensions. The root key, $K_m$ is the key associated with the top level of the tree and it is used as the MDP-key. Every member in the group of users is provided with individual keys, e.g. in a registration phase, and these keys are associated with the leaves $K_{(rst)}$ at the bottom of the tree. Every member also receives all the keys lying on the path from its leaf up to the root. A typical message is made of triplets $\{i>j, [K_i]_{Kj}\}$, where i>j denotes that node i is an ancestor to node j. A member can decrypt the message part if j is on the path up to the root i.e. $K_i$ can be retrieved by use of the key $K_j$ associated with node j. Thus, the set of $K_i$ comprises hierarchical encryptions of the root key $K_m$, i<m. When updating the MDP-key because of a joining or leaving member, the numbers of required messages are few, as well as the message size. A major drawback is that the system is state-full or state-dependent, i.e. the algorithm makes use of the previous group key to encrypt the new generated group key. Therefore, the dependency of state is required for the scheme. In the case the group key for a certain state is lost it is not possible for the participant to re-catch the session by all means.

Another drawback is that a provided method for batch re-keying, i.e. batch update of keys, is not very efficient in particular at times of major and momentary changes of memberships.

The Subset Cover algorithms is a general class of group-key distribution protocols, characterized in that a group member is associated with a subset of members, the subset being associated with a particular key. The Subset Difference (SD) protocol, illustrated in FIG. 3, is an example of these protocols. With reference to FIG. 3 the nodes are numbered with an index j. Exemplary in FIG. 3 the nodes 2, 3, 5, and 12 are indicated. A collection of subsets $S_{i,j}$ covers the complete group and distinctly determines the set of all members. $S_{i,j}$ denotes the set of leaves under node i but not under node j. In FIG. 3 the sets $S_{2,5}$ and $S_{3,12}$ are illustrated. When updating the MDP key, the group of members is exactly covered with these subsets, and the updated key is encrypted under each of the subset keys. The SD (Subset Difference) scheme is a stateless group-key distribution protocol The SD scheme creates a binary tree with as many leaves as possible members. Every possible member is associated with a specific leaf, i.e. users who are not members at the particular moment are also associated with a leaf. The key server (KS) creates the set S of entities $S_{i,j}$. Every $S_{i,j}$ is also uniquely associated with a key $L_{ij}$, which every member of the set $S_{i,j}$ can compute, but no other group member. The MDP-key can be updated to a particular set $S_{i,j}$ by encrypting it using $L_{ij}$. It should be noted that this has to be done for every $S_{i,j}$ belonging to S. The $L_{ij}$'s are created in a hierarchical fashion, where a random seed associated with the node i is extended to nodes j>i using a one-way function iteratively.

The LSD (Layered Subset Difference) scheme is a SD scheme, but with special layers such that every possible member needs to store fewer keys than in the original scheme. In all these systems, the group key management message that is broadcasted to all users is quite large and needs to be authenticated. In unicast, a shared secret key message authentication code (MAC) is used to provide authentication. In broadcast, the group key (MDP) provides a shared secret key, however, performing message authentication with this key only verifies that the sender is a member of the group, but not necessarily the intended source. The naive approach would of course be to authenticate the message as is using a message authentication code or signature. The naive approach of authenticating the entire broadcast message cannot simply tolerate bit errors or packet loss of parts of the group key management message without the authentication failing.

The naive approach is also resource consuming, increasing both computational cost and bandwidth consumption.

Another approach would be to authenticate each encrypted key. This also proves to be resource consuming (both computational and bandwidth consuming). In fact the number of encrypted MDP-keys in SD are at most min (2r−1, n/2, n−r), where n is the total number of members and r is the number of revoked members.

Reference [1] discloses a stateless hierarchical method based on subset cover of the group of users.

The size of a key management message tends to become very large in large groups. Therefore, various attempts have been made to make the broadcast of a key management message as efficient as possible.

Reference [2] discloses a method to arrange the users in dependence of the probability that a user will be compromised thereby allowing for an increased efficiency of the key management system.

Reference [3] discloses authentication of the MDP-key. However, the scalability of this solution is less favorable than that obtained according to the invention. Further, the solution according to reference [3] does not allow for effective optimizations, as the user needs to obtain the entire key management message in order to verify the signature.

Reference [4] discloses a scheme applied to the LKH method in order to introduce authentication. The disclosed scheme is based on the principle that a hash chain generates each key in the tree. When a group member receives a new key, computing a hash over the new key and comparing the hash with the old key can verify its correctness. Although this method creates only a small overhead it is not practical to use in reality as the LKH based re-keying and its authentication can, thereafter, only be applied a limited number of times equal to the length of the hash chain. Furthermore, it will not be possible for the key server to generate the keys by itself if needed.

As mentioned above, a group key management message will become very large when the group of users increases. It would be very resource consuming to frequently multicast or broadcast such messages over a cellular network. There is also a question which party would finance the expensive radio link resources required to transmit the messages. References [5, 6] advice a distributed system of entities each entity managing a subgroup of the full group. Each subgroup is further associated with a separate group key. Although these systems provide scalability they become complex and expensive. Another problem with the cited methods is related to distribution of security functionality to another entity whereby such other entity must be trusted to securely handle the security functionality and also to be able to handle authentication and authorization of users. This makes such systems more exposed to compromise. As a consequence, such systems do not manage optimizations done by entities not trusted with keys or other secret information.

Thus, there is a need for an efficient and reliable method for group-key distribution in broadcast and multicast systems that overcome the drawbacks of prior art systems. In particular there is a need for a method that provides for authentication of the MDP-key at the same time allowing for an optimization of the message. Preferably, the optimization shall be possible without the need to require knowledge of any of the keys used.

SUMMARY OF THE INVENTION

The present invention overcomes these and other drawbacks of the prior art arrangements.

It is a general object of the present invention to provide an efficient method for group-key distribution in broadcast protection systems.

It is another object of the invention to provide authentication in broadcast protection systems without sacrificing robustness and scalability.

Yet another object is to significantly reduce the size of a group key management message without compromising security.

A further object of the invention is to make the authentication tolerant to packet loss and bit errors.

Still another object is to reduce the computational overhead related to the cryptographic calculations required in a secure group-key distribution system.

Yet another object of the invention is to provide each member or a sub set of the members of a broadcast group with a group key management message that only contains the necessary parts of a complete key message for calculating an MDP-key.

These and other objects are met by the invention as defined by the accompanying patent claims.

Briefly, the invention involves establishing a top-level key for media protection, and encrypting the top-level key under the output key of the group key distribution protocol used. Next, an authentication signature is applied on at least the encrypted top-level key. Adding the encrypted top-level key and the authentication signature modifies the group key management message. The modified group key management message is then broadcasted to the members of a user group.

This opens up for authentication of only the encrypted top-level key, thereby avoiding an excessive increase of the message size and ensuring a high fault tolerance. In addition, the introduction of the new top-level key may be used to ensure that there will be only one encrypted media protection key contrary to certain protocols that create a plurality of encrypted media keys.

The encrypted top-level key and the authentication signature may, as a matter of design choice, be included in the same message element or in different message elements in the modified group key management message.

If desired or otherwise appropriate, a verification tag may also be added to the group key management message to enable verification of the correctness of the encrypted top-level key.

The invention is generally applicable, e.g. to protocols such as the logical key hierarchy protocol (LKH), the subset difference protocol (SD), and the layered subset difference protocol (LSD).

Another aspect of the invention concerns optimization of a group-key management message that comprises identifiable message elements. This optimization aspect of the invention is based on modifying the group key management message M according to given optimization rules to filter away a number of said message elements, and to output a modified group key management message M'.

For example, the group key management message may originally be related to a group of receivers. In a preferred realization, which then considers a given sub-group of the receivers, the modification or optimization of the group key management message preferably involves identification of those elements in the group key management message that are required by the sub-group for determining a group or media key. Excluding those elements that are not required by the sub-group finally creates the modified group key management message.

The invention offers the following advantages:
Group key management message authentication that is tolerant to packet loss and bit errors.
An authentication method that can be used with group key management message optimization.
A group member can implicitly authenticate each part of a group key management message.
A drastic reduction of the message size without compromising security.
Less computational load on the terminal due to the reduced message sizes.

Other advantages offered by the present invention will be appreciated upon reading of the below description of the embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS OF THE INVENTION

Figure 1:
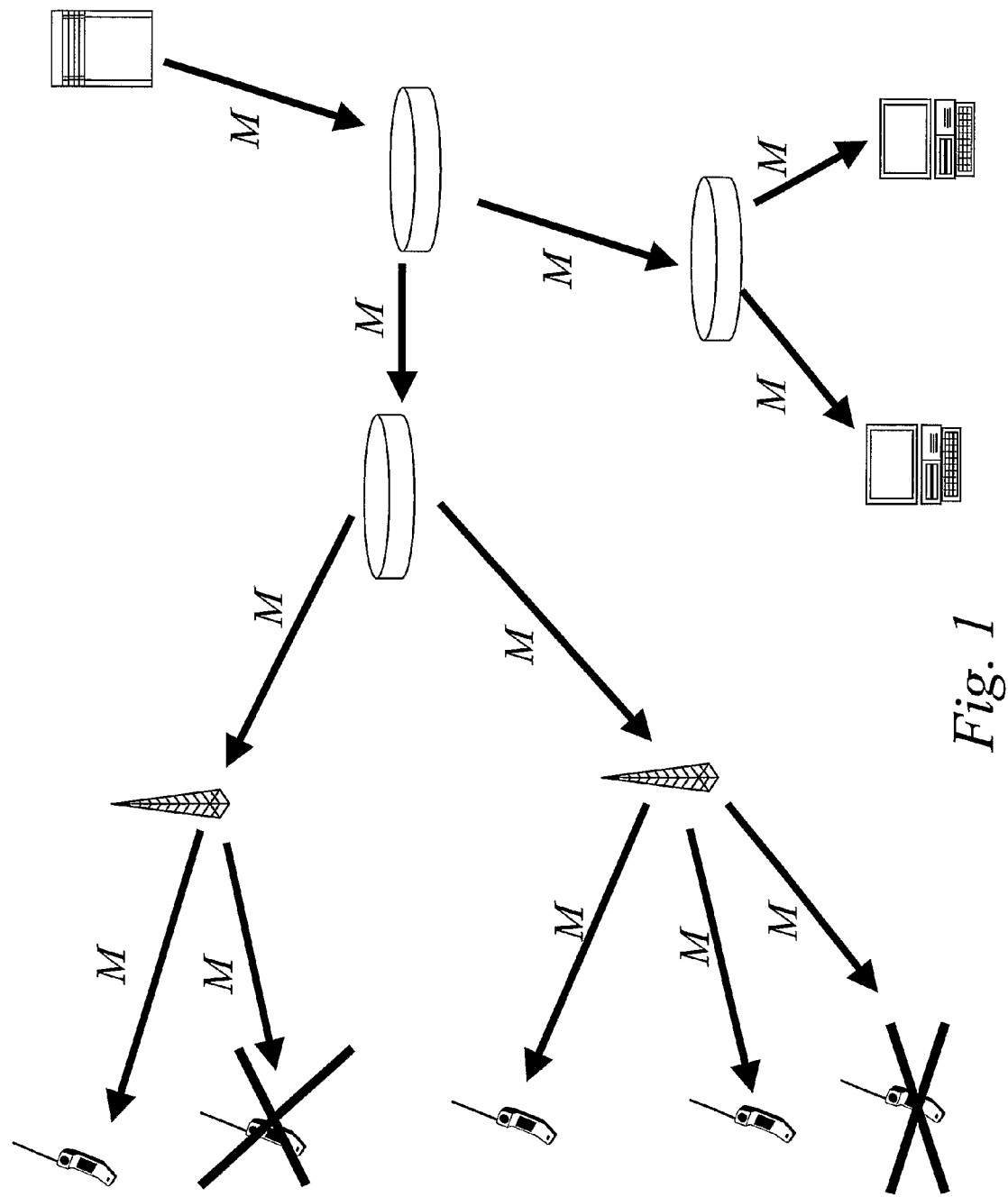
FIG. 1 is an exemplary overview network for distribution of a group key management message.

Throughout the drawings, the same reference characters will be used for corresponding or similar elements.

Figure 4:
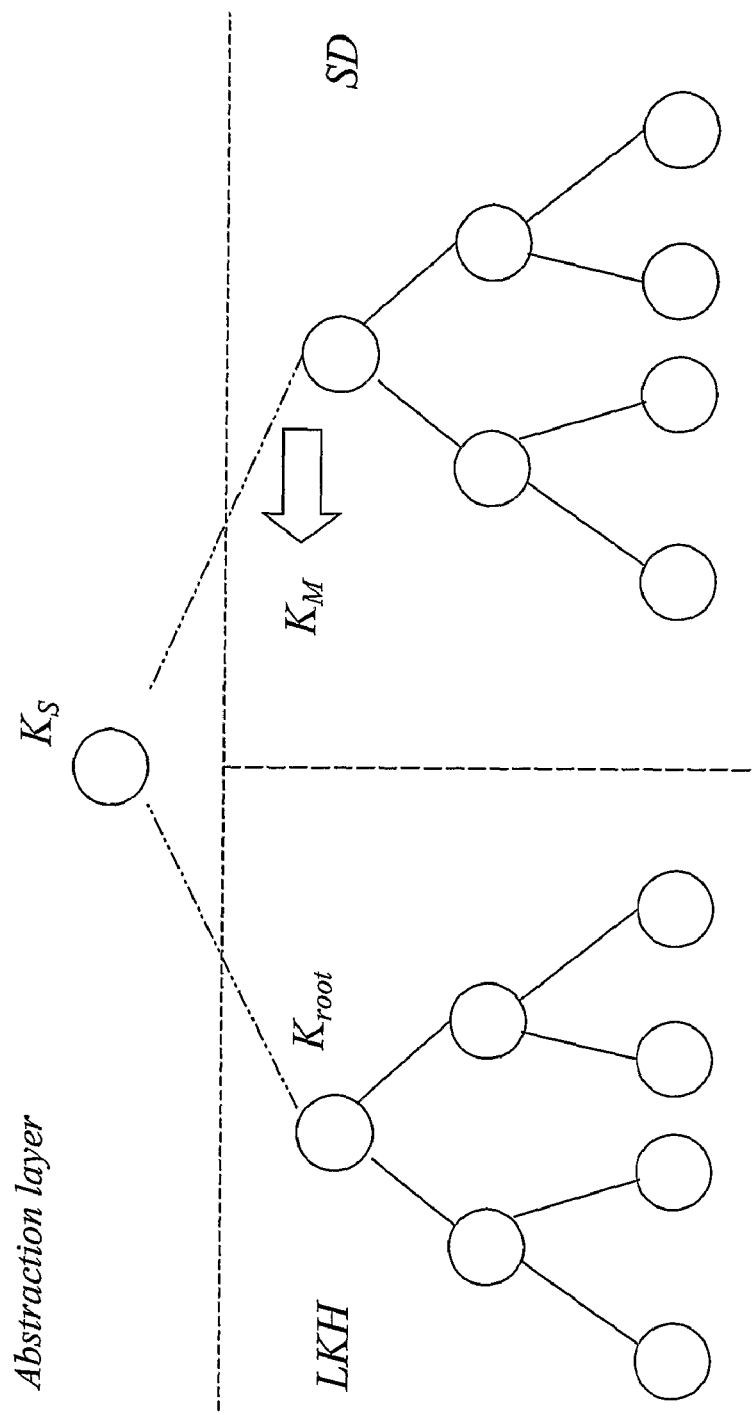
FIG. 4 shows a new abstraction layer according to the invention.

As schematically illustrated in FIG. 4, a first aspect of the invention concerns the introduction of a new abstraction layer comprising a top-level key that is typically used as the MDP-key. The new abstraction layer is illustrated on top of the exemplary basic protocols LKH and SD, respectively.

Figure 5:
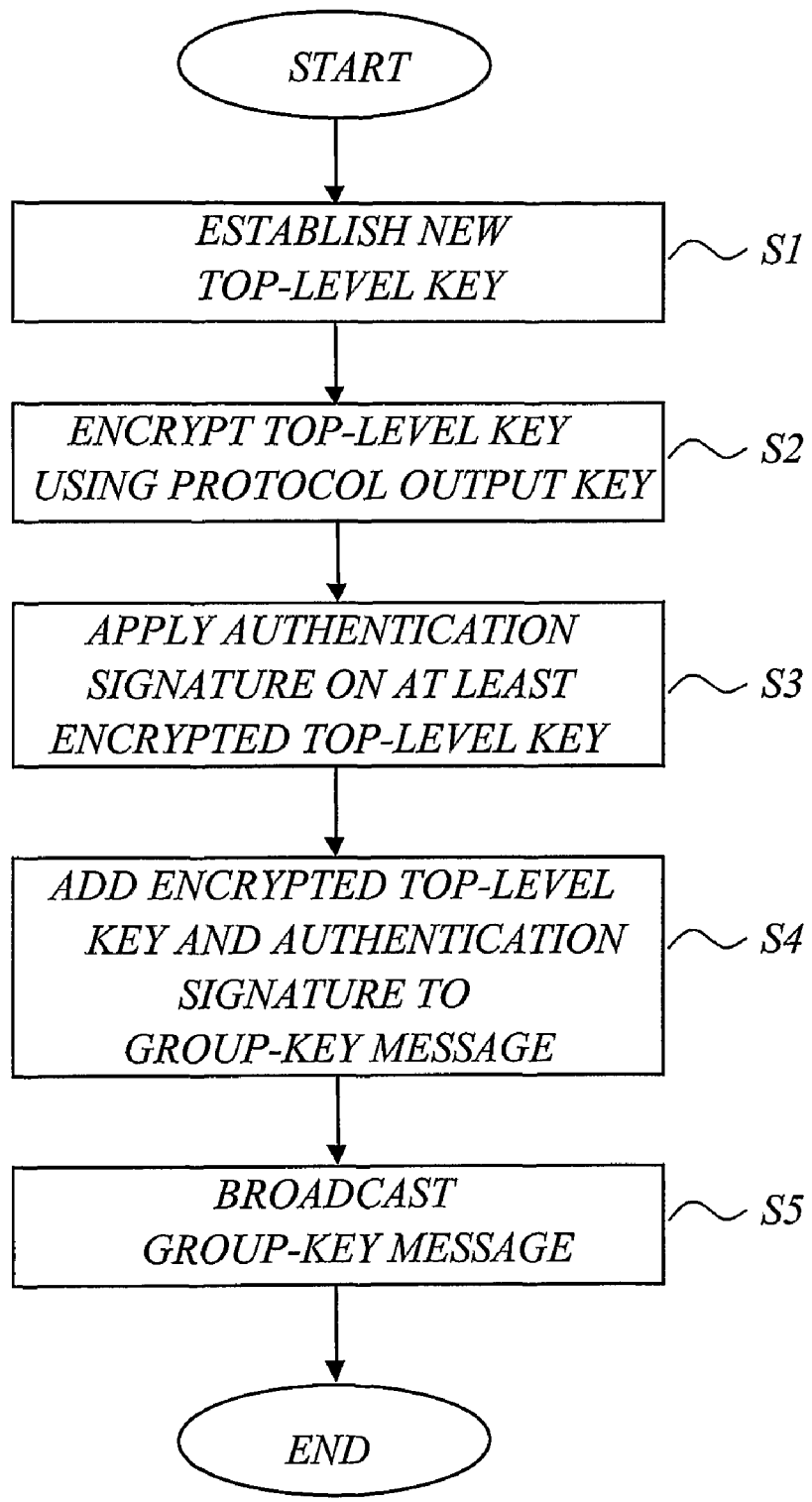
FIG. 5 is a flow chart according to a preferred basic embodiment of the invention.

FIG. 5 is a schematic flow chart of a preferred basic embodiment of this aspect of the invention. In step S1, the new top-level key (e.g. for media protection) is established, and in step S2, the top-level key is preferably encrypted under the output key of the particular group key distribution protocol used. Next, in step S3, an authentication signature is applied on at least the encrypted top-level key. In step S4, the group key management message is modified by adding the encrypted top-level key and the authentication signature, for example in the same message element or in different message elements in the modified group key management message. In step S5, the modified group key management message is then broadcasted to the members of a user group.

When only the encrypted top-level key is authenticated, an excessive increase of the message size is avoided and high fault tolerance is ensured. In addition, the introduction of the new top-level key may also be used to ensure that there will be only one encrypted media protection key, in clear contrast to certain prior art protocols that create a plurality of encrypted media keys.

It may be beneficial to generate a verification tag that is added to the group key management message to enable verification of the correctness of the encrypted top-level key, as will be explained in detail later on.

The first aspect of the invention will now be described in more detail with reference to a number of exemplary embodiments of the invention.

A first exemplary embodiment of the invention involves establishing a top-level key and optionally also a verification tag. The top-level key is used as the MDP key for encrypting the broadcast medium. Only the part of the key message M that contains the encrypted top-level key is authenticated, e.g. using a signature or a Message Access Code (MAC). Any known group-key distribution protocol P is then used that is based on the creation of a hierarchy of keys. Examples of such methods are the LKH and SD methods. The protocol P has an output key H that is traditionally used as the MDP key. However, according to the invention, said key H or a derivative thereof is now used to encrypt the top-level MDP-key.

If verification of the correctness of the top-level key is desired, the verification tag is used. Otherwise the verification tag may be omitted.

A member who receives a group key management message should not need to receive the entire message correctly, but only the part that is needed to compute the new key. An authentication mechanism is disclosed that uses an implicit hierarchy by introducing a top-level key $K_S$ and a special verification tag VT dependent on $K_S$ and possibly on the output key H. The verification tag is thus generally denoted $VT(H, K_S)$. The top-level key $K_S$ and the verification tag VT are authenticated exemplary using a digital signature. In addition, an optimization method is applied together with the key distribution method, making it possible to further reduce the size of a key message without compromising the security.

Figure 2:
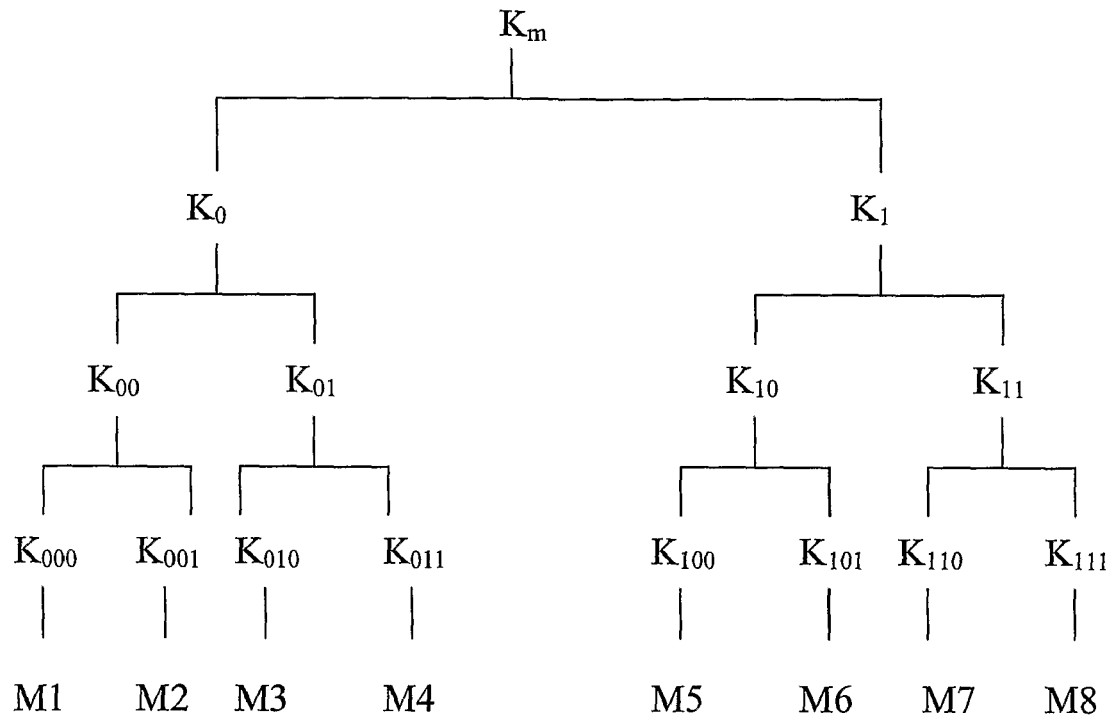
FIG. 2 is a logical tree representative of prior art hierarchical system for adaptation of group key management message to a specific user group.
Figure 3:
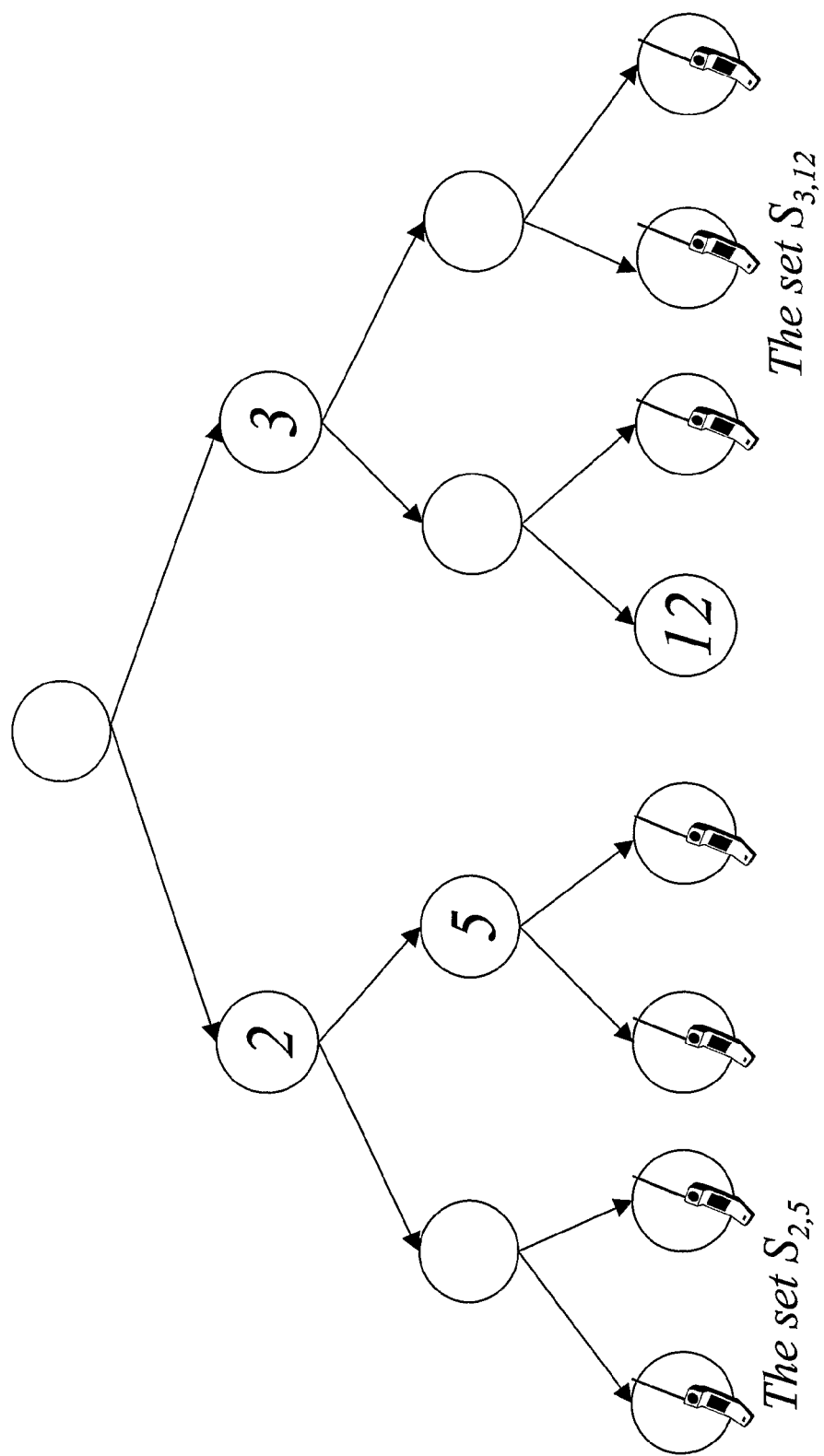
FIG. 3 is a logical tree representative of prior art subset difference method.

All group-key distribution protocols for broadcast or multicast are characterized in that the entire group key management message is sent to all group members. The precise message is dependent on the protocol P used. It is assumed in the following that the protocol P is a hierarchical protocol characterized by a logical hierarchy of keys $H_{U_{ij}}$ where $U_{ij}$ is an index identifier. Exemplary, with reference to FIG. 2, i may be the compound index (0, 1) associated with a certain hierarchical level, and j=0 or 1. Thus, $U_{ij}$=(0,1; 0) or (0,1; 1) associates with the hierarchical level next below said certain level. The precise meaning of the compound index identifier $U_{ij}$ depends on the protocol P.

To better understand the invention a generalized structure of a group key management message may be defined as follows:

$$M = \{U_{ij}, E(H_{Uij}, \hat{H}_{Uij}) \ldots U_{kl}, E(H_{Ukl}, \hat{H}_{Ukl})\}$$

In this expression $H_{Uij}$ is an encryption key used in the encryption function E, and $\hat{H}_{Uij}$, depending on the protocol P used, is the final output key H or encryptions of the next encryption key corresponding to the levels in a hierarchical protocol. In some protocols, e.g. subset cover protocols, the encrypted key $\hat{H}_{Uij}$ is independent of $U_{ij}$, hence, all $\hat{H}_{Uij}$ are the same and equal to H. Other protocols, such as LKH, introduce dependencies between the elements $E(H_{Uij}, \hat{H}_{Uij})$ such as to form a linked chain. Generally, each user is provided with a number of encryption keys $H_{Uij}$ that enables decryption of the H key. Depending on the particular protocol P the method for determining the keys to use for decryption varies as is well known in the art. At least one encrypted part of the message, identified by index $U=U_{mn}$, contains the protocol output key $H=H_{Umn}$.

As previously mentioned in connection with FIG. 4, the invention introduces a new abstraction layer and a top-level key $K_S$ that is used as the MDP-key. In FIG. 4, the new abstraction layer is illustrated on top of the exemplary basic protocols LKH and SD respectively. Thus, in FIG. 4 the root key $K_{root}$ of LKH is the protocol output key H and, in the SD case $H=K_M$. The top-level key $K_S$ is added to the message set M, and encrypted under the protocol output key H for the particular protocol P. Thus, H encrypts $K_s$: $E(H, K_s)$. The introduction of $K_s$ ensures that there will be only one encrypted MDP-key contrary to certain protocols that create a plurality of encrypted MDP-keys. Preferably, only the encrypted key $K_s$ is directly authenticated thereby avoiding an excessive increase of the message size and at the same time ensuring a high fault tolerance. The authentication will be denoted $PF(H, K_s)$ where PF denotes some protection function e.g. involving a signature made by a signing server using a private key. The precise nature of the function PF depends on the protocol P used as will become clearer in example embodiments that follow. A group member can receive the corresponding public key through any suitable communication, e.g. as part of an initial registration phase. In the case of protocols with linked chains of elements $E(H_{Uij}, \hat{H}_{Uij})$, $K_s$ will be the last key in the chain of keys in M and an authentication of $K_s$ ensures then the authenticity of the entire chain of keys. According to the generalized structure of a key message introduced above, the key message according to the invention looks as follows:

$$M = \{U_{ij}, E(H_{Uij}, \hat{H}_{Uij}) \ldots U_{kl}, E(H_{Ukl}, \hat{H}_{Ukl}), U, PF(H, K_s)\} \quad \text{Eq (1)}$$

In the case of chained dependencies between the different parts $E(H_{Uij}, \hat{H}_{Uij})$ the encrypted $K_s$ in the message $\{U_{ij}, E(H_{Uij}, \hat{H}_{Uij}) \ldots U_{kl}, E(H_{Ukl}, \hat{H}_{Ukl}), U, PF(H, K_s)\}$ cannot be verified to be correct. An error in any part $\{U_{kl}, E(H_{Ukl}, \hat{H}_{Ukl})\}$ would still allow derivation of a key, however, this key is not related to the key $K_s$ and its correctness cannot be verified. As mentioned earlier, a verification tag may also be introduced to verify the correctness of the encrypted Ks.

In a first exemplary realization, the verification tag comprises a function f of the encrypted key $K_s$. For example, the function PF has the form $PF=\{E(H, K_s+f(K_s)), \text{Sign}[E(H, K_s+f(K_s))]\}$. The operation (+) typically indicates concatenation of the two operands. The function f is public and shared with a member terminal e.g. in the above mentioned initial registration phase. Exemplary, the function f is a checksum of its argument.

The final message according to this embodiment then looks as follows:

$$M = \{U_{ij}, E(H_{Uij}, \hat{H}_{Uij}) \ldots U_{kl}, E(H_{Ukl}, \hat{H}_{Ukl}), U, E(H, K_s+f(K_s)), \text{Sign}(E(H, K_s+f(K_s)))\}.$$

Figure 6:
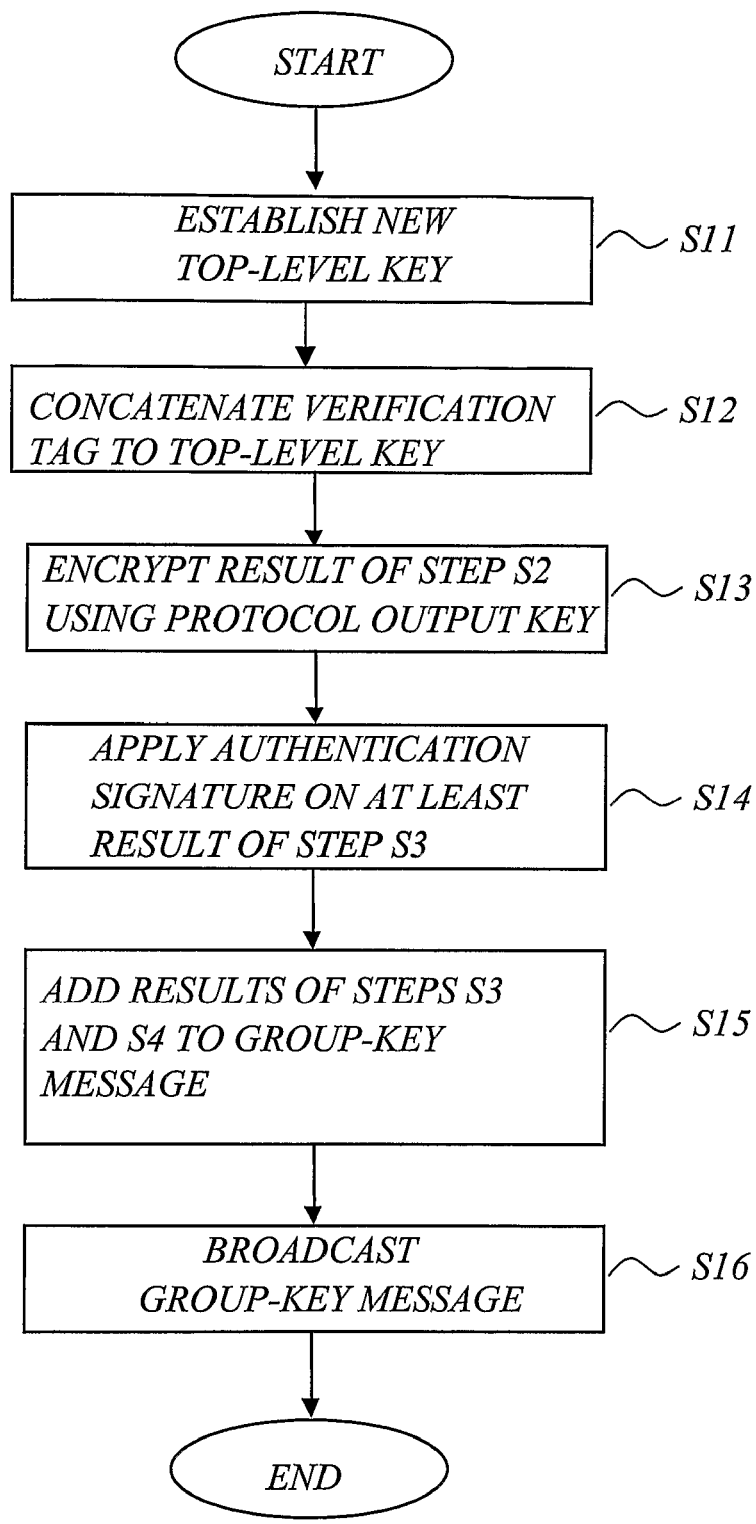
FIG. 6 is a flow chart according to another preferred embodiment of the invention.

FIG. 6 is a flow chart illustrating the process of generating a message M. At S11 a top-level key is first created or selected from a set of pre-calculated keys. At S12 a verification tag is concatenated with the selected top-level key. At S13 the result of step S12 is encrypted using the output key of the selected key distribution protocol. At S14 an authentication signature is applied to at least the result of step S13. At step S15 the results of steps S13 and S14 are added to the group-key management message. The generated group-key management message is finally broadcasted at step S16.

Figure 7:
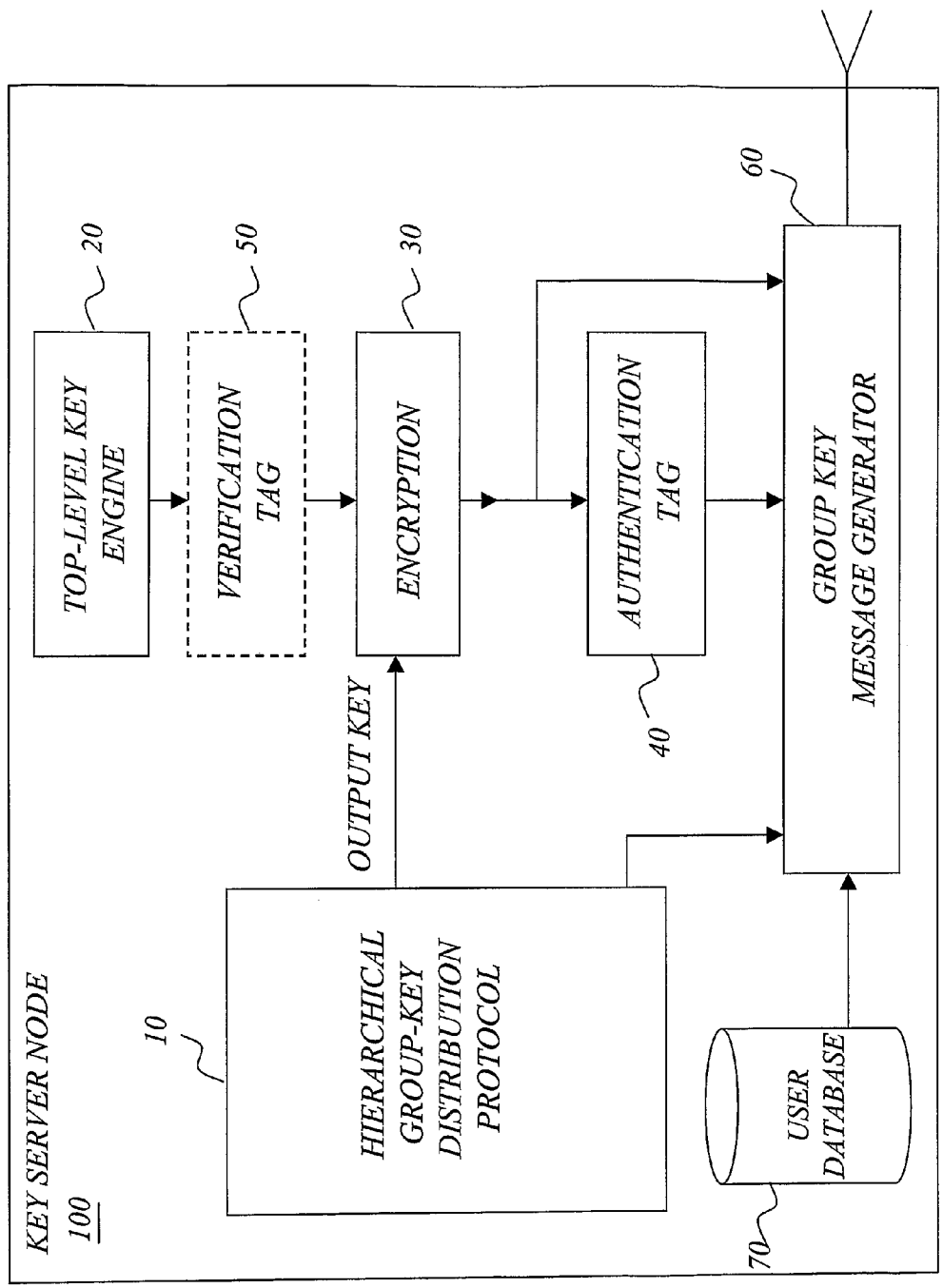
FIG. 7 is a block diagram illustrating an exemplary arrangement for creation of a group key management message according to an embodiment of the invention.

FIG. 7 illustrates an exemplary arrangement of a key server node for creation of a group key management message according to a preferred embodiment of the invention. The key server node 100 basically comprises a unit 10 implementing a selected hierarchical group-key distribution protocol, a top-level key engine 20, an encryption unit 30, an authentication tag unit 40, an optional verification tag unit 50, a group key message generator/modifier 60 and a user database 70. The top-level key engine 20 generates a top-level key that is preferably forwarded to the optional verification tag unit 50 for generating and concatenating a verification tag. The output from unit 50 is provided to encryption unit 30. The encryption key used in unit 30 is the output key received from use of a prior art hierarchical group-key distribution protocol implemented at unit 10. The output from encryption unit 30 is provided to a group key message generator/modifier 60 and to unit 40 for generation of an authentication tag. Unit 40 exemplary generates a key pair and uses the private key for signing the received output from encryption unit 30. The authentication tag output from unit 40 is also input to the group key message generator 60. The group key message generator 60 generates a modified group key message based on the original message obtained from the hierarchical group-key distribution protocol, preferably by using information from the database 70 about the organization of the receiving users in at least one group of users. The group key message is, thereafter, sent to at least one device for broadcasting the message.

In a second exemplary realization, the verification tag is based on calculating a Message Access Code (MAC). The detailed method of calculating $PF(H, K_s)$ comprises the following steps.

1. Create, using a one-way function e.g. a pseudo-random function F, one encryption key $K_E$ and one authentication key $K_A$ from $H=H_{Umn}$ the output key for the protocol P.
2. Encrypt $K_S$ using $K_E$, i.e. $A=E(K_E, K_S)$
3. Generate a verification tag by applying a MAC on the result of 2, i.e. $B=\text{MAC}(K_A, A)$
4. Apply a signature over A and B, i.e. $\text{Sign}(A+B)$
5. The final result will then be $PF(H, K_s) = \{E(K_E, K_S), \text{MAC}(K_A, E(K_E, K_S)), \text{Sign}(E(K_E, K_S)+\text{MAC}(K_A, E(K_E, K_S))))\}$ Again the operation (+) typically indicates concatenation. It is assumed here that the function F is shared with the users e.g. in an initial registration phase enabling users to derive the keys $K_E$ and $K_A$ from the decrypted protocol output key H. When a group member terminal receives a message of the general form (Eq1), it collects the information directed to it and decrypts the keys therein using the provided set of keys $H_{Uij}$. When, during this process, the part $PF(H, K_s)$ is reached, the MDP key $K_s$ is decrypted and its correctness and authenticity verified by checking the appended verification and authenticity parts of the message.

For a more thorough understanding, examples of more detailed steps of the given exemplary realizations will be described in the following.

Considering again the first exemplary realization of the invention, the detailed steps may for example be defined as follows:

1. The member terminal identifies the subset M'={$U_{ij}$, $E(H_{Uij}, \hat{H}_{Uij})$ ... $U_{kl}$, $E(H_{Ukl}, \hat{H}_{Ukl})$, U, PF(H, $K_s$)} of M, containing only elements directed to the member, i.e. each {$U_{ij}$, $E(H_{Uij}, \hat{H}_{Uij})$} in M' is directed to the member.
2. According to the general hierarchical method the member terminal locates one component {$U_{ij}$, $E(H_{Uij}, \hat{H}_{Uij})$} in the set M' for which it has key $H_{Uij}$ that decrypts E to find $\hat{H}_{Uij}$.
3. The component {$U_{ij}$, $E(H_{Uij}, \hat{H}_{Uij})$} is removed from the set M' and the step 2 is repeated with $\hat{H}_{Uij}$ as the current key $H_{Uij}$.
4. The looped process is ended when M' only contains {U, PF(H, $K_s$)}.
5. Now M'={U, PF(H, $K_s$)} and the last decrypted key $\hat{H}_{Uij}$ will here be H. Given that PF(H, $K_s$)={E(H, $K_s$+f($K_s$)), Sign [{E(H, $K_s$+f($K_s$))]}, the member terminal can then decrypt $K_s$+f($K_s$) and verify the verification tag f($K_s$) using the function f.
6. If step 5 is successful the member terminal next verifies the signature Sign to authenticate the source by using a server public key.

It is noticed that given that each decryption in step 2 is done correctly, i.e. each key in the encryption chain is retrieved correctly, $K_s$+f($K_s$) will be retrieved correctly and the verification tag will give an implicit verification that all keys have been retrieved correctly. If any key has not been decrypted correctly, the verification tag will fail.

The corresponding detailed steps in the second exemplary realization of invention may for example be defined as follows:

1. The steps 1-4 of the first aspect of the first embodiment is executed in the same manner to obtain {U, PF(H, $K_s$)}, for which member terminal has the decryption key H.
2. The keys $K_E$ and $K_A$ are derived from H using the function F.
3. The media key $K_S$ is derived from the message element PF(H, $K_s$)={E($K_E$, $K_S$), MAC($K_A$, E($K_E$, $K_S$)), Sign(E ($K_E$, $K_S$)+MAC($K_A$, E($K_E$, $K_S$)))} by decrypting E ($K_E$, $K_S$), using the derived key $K_E$.
4. A check of correctness and authenticity is made using the key $K_A$ and the MAC and the signature, Sign, is verified to authenticate the source by using a server public key.

In another aspect of the invention, a further and generally applicable optimization of the message is obtained, without compromising the robustness of the above authentication scheme. Consider again the general form of a message given above:

$$M=\{U_{ij},E(H_{Uij},\hat{H}_{Uij}) \ldots U_{kl},E(H_{Ukl},\hat{H}_{Ukl}), \ldots \},$$

or more specifically:

$$M=\{U_{ij},E(H_{Uij},\hat{H}_{Uij}) \ldots U_{kl},E(H_{Ukl},\hat{H}_{Ukl}), U,PF(H, K_s)\}$$

Given the message M and a subset R⊂N of receiving members N, the optimization method is generally executed as follows:

1 Create new message M'=∅.
2 For each {$U_{ij}$, $E(H_{Uij}, \hat{H}_{Uij})$}∈M, directed to a member $p_n$∈ R, add {$U_{ij}$, $E(H_{Uij}, \hat{H}_{Uij})$} to M' or, otherwise, discard if $p_n \notin$ R (optimization rules).
3 Replace M with M'.

In effect, this means that those message elements that are not required by the subset or sub-group R are effectively filtered away or excluded from the group key management message.

Figure 11:
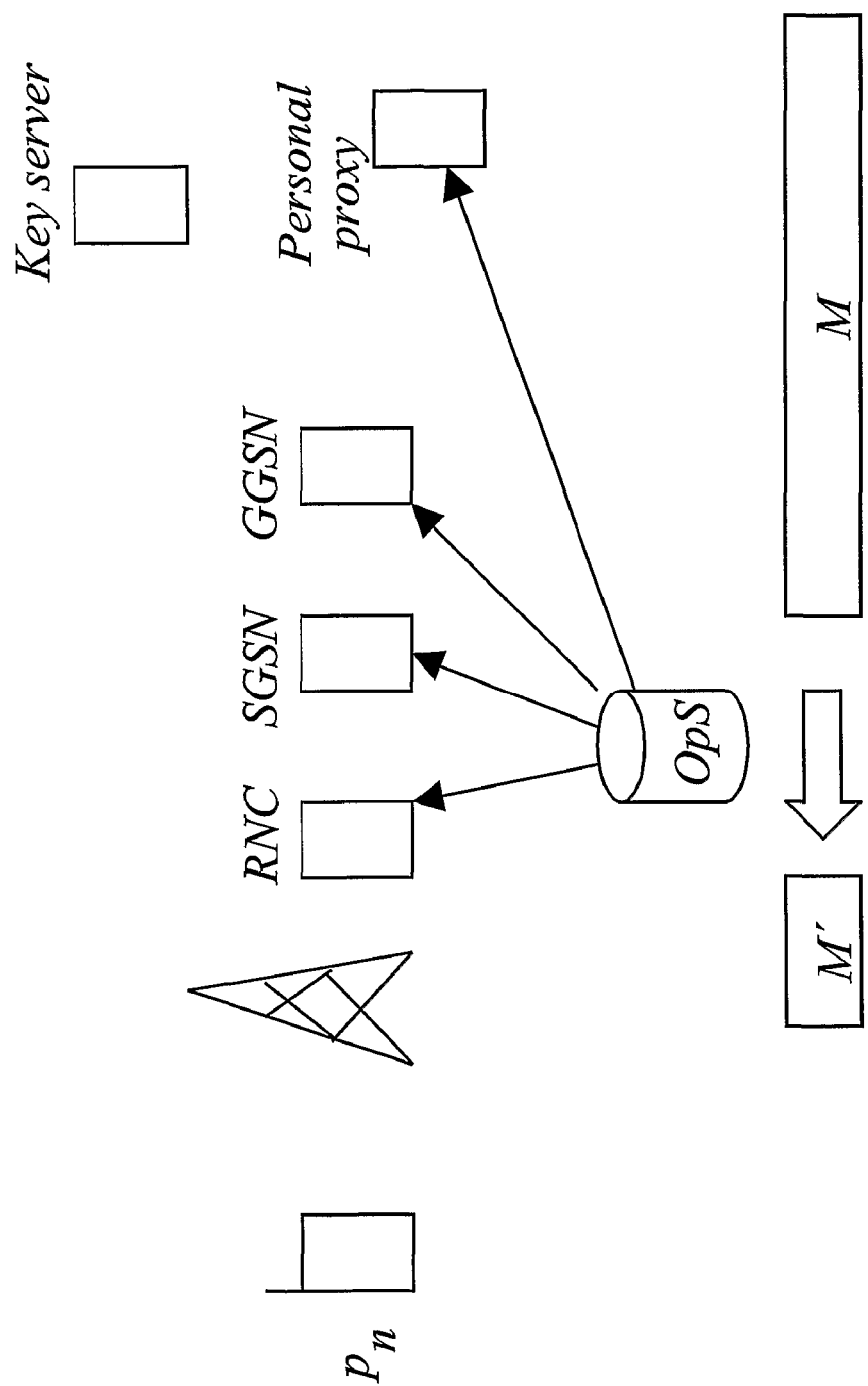
FIG. 11 illustrates exemplary locations in a network of an optimization server according to the invention.

The method optimizes relative to a subset R ⊂ N of the receiving group N. The method can be implemented, e.g. in an optimization proxy server Ops located anywhere in the path between a group member and the key server, KS. FIG. 11 illustrates an exemplary Ops server and its possible location in network nodes RNC, SGSN or GGSN that are typical for a WCDMA mobile communications system. Other suitable network nodes may include RBS nodes, border gateways and personal proxy units. It should though be understood that the invention is not limited to wireless applications, but can be applied to for example Internet service applications. In step 2 of the general method the Ops server knows the structure of the hierarchical protocol and can, therefore, determine if a message element is directed to a member of the receiving group. The exact procedure for determination is dependent on the protocol used as is further discussed below. However, it is noticed that the method can be applied without Ops requiring any information about the secret keys in the protocol or other secret information. The decision to discard information in step 2 can be made solely on the non-encrypted part of the key management message, i.e. $U_{ij}$. The server Ops may also be located in a personal proxy server. A message M is input to the Ops server and optimized to appear at the Ops output as a decreased message M'.

It can be noted that after applying this method, a member $p_n \subset$ R is still able to verify the authenticity if the previously described authentication method is used. This is due to the fact that the optimization method only discards messages not directed to a member of R and that the member still can retrieve $K_s$. It should though be noted that this optimization aspect of the invention is applicable with or without the new top-level key.

According to a first exemplary embodiment of the optimization aspect of the invention, the protocol P is a LKH protocol. It is assumed that H is the root key of the LKH based protocol. The optimization is preferably done as follows:

1. Retrieve the group key management message M={$U_{ij}$, $E(H_{Uij}, \hat{H}_{Uij})$ ... $U_{kl}$, $E(H_{Ukl}, \hat{H}_{Ukl})$, U, PF(H, $K_s$)}, where $U_{ij}$ denotes an identifier for the encryption key ($H_{ij}$) used in the encryption function E, ($\hat{H}_{ij}$) is the encrypted key.
2. Create a new M'=∅.
3. For each {$U_{ij}$, $E(H_{Uij}, \hat{H}_{Uij})$} ∈ M, directed to a $p_n$∈ R i.e. where the node $U_{ij}$ is on the path between the member and the root, add {$U_{ij}$, $E(H_{Uij}, \hat{H}_{Uij})$} to M'.
4. Add {U, PF(H, $K_s$)} to M'
5. Set M=M'. M will now only include messages parts that are intended for the members, which the message is optimized for.

According to a second exemplary embodiment of the optimization aspect of the invention, the protocol P is a Subset Cover protocol and the output key is denoted by H=$K_M$. The optimization is preferably done as follows:

1. Retrieve the group key management message M={$U_{ij}$, $E(H_{Uij}, K_M)$ ... $U_{kl}$, $E(H_{Ukl}, K_M)$, U, PF(H, $K_s$)}, where $U_{xy}$ defines a specific subset of users that can decrypt the corresponding $E(H_{Uxy}, K_M)$.

2. Create a new M'=Ø.
3. For each $\{U_{ij}, E(H_{Uij}, K_M)\} \in M$, directed to a $p_n \in R$ (i.e. where $p_n \in U_{ij}$), add $\{U_{ij}, E(H_{Uij}, K_M)\}$ to M'.
4. Add $\{U, PF(K_M, K_s)\}$ to M'
5. Set M=M'. M will now only include messages parts that are intended for the members, which the message is optimized for.

Again referring to FIG. 11 an optimization proxy implements the optimization method for filtering the group key management message from unnecessary parts. The proxy can be located in different parts of the system, depending on the network topology and the required optimization. The closer it is located to the cellular interface or the group members, the better it can reduce the message. Preferably, the proxy is integrated with the GGSN or other user-aware network node such as a proxy, firewall, or home agent. The filtering is performed without breaking the security and availability of the service. More than one filtering proxy may exist in different parts of the system. The basic function of the proxy is to reduce the size of the group key management message for each subgroup of group members by eliminating redundant and irrelevant information, i.e. message parts that are not needed for a subgroup to calculate the MDP key.

Figure 9:
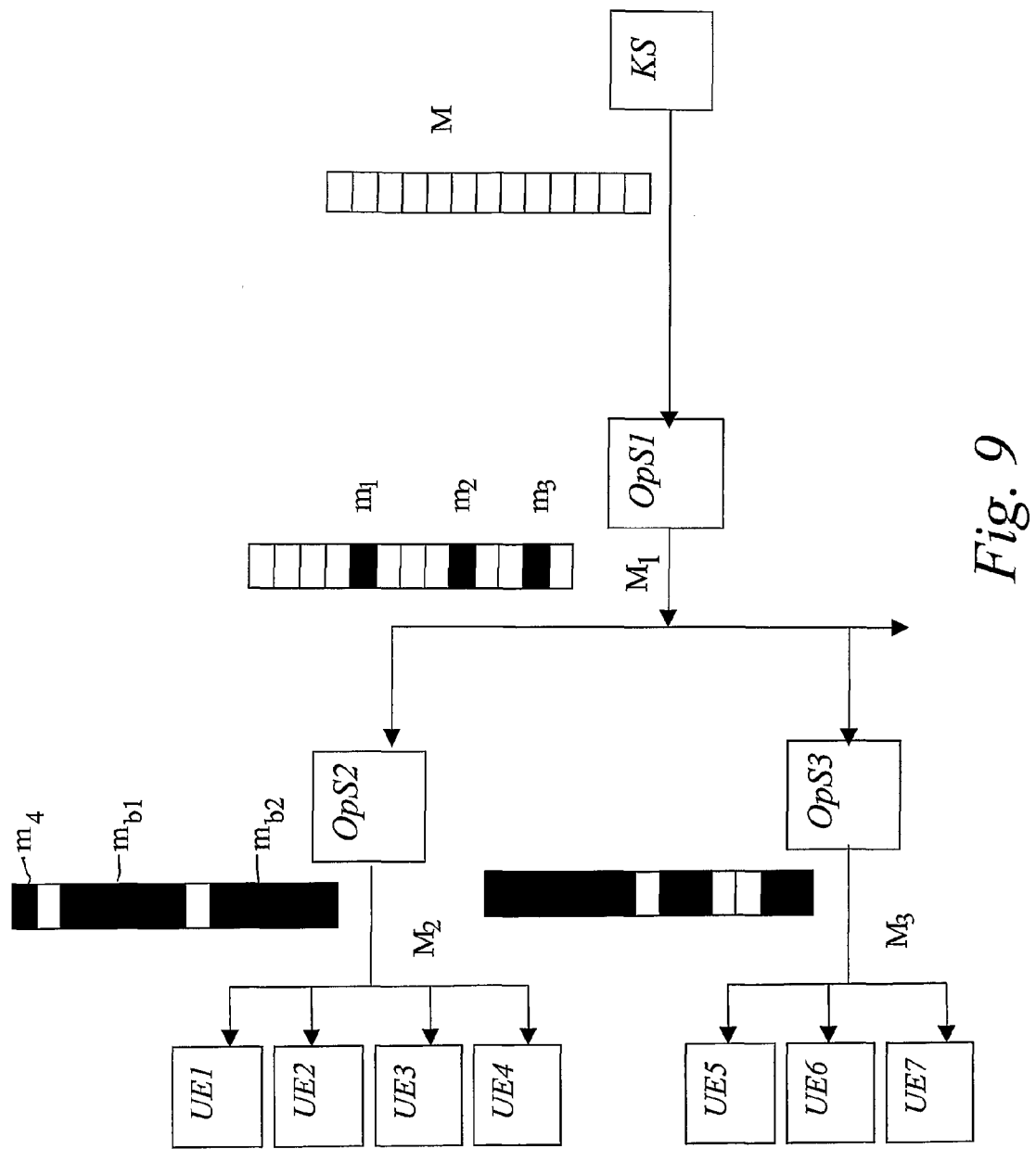
FIG. 9 is a diagram that illustrates the operation of one or more optimization servers according to an embodiment of the invention.

FIG. 9 illustrates an example of the filtering process. In FIG. 9 two subgroups of members (UE) are shown. A key server (KS) generates an original group key management message (M) that is input to a first filtering proxy (OpS1) that eliminates the message components $m_1$, $m_2$, and $m_3$. OpS1 may, for example, be located at a RNC node and filter those members that are not located in the cell area controlled by the RNC node. The modified message $M_1$ is thereafter forwarded to the proxy servers OpS2 and OpS3. These may, for example, be located at respectively a radio base station serving a radio cell. Thus, OpS2 can filter those members that are not located in the controlled cell area. Exemplary, in FIG. 9, message component m4 and message blocks $m_{b1}$ and $m_{b2}$ are eliminated resulting in a modified message $M_2$ that is finally broadcast to the members of the subgroup.

Figure 8:
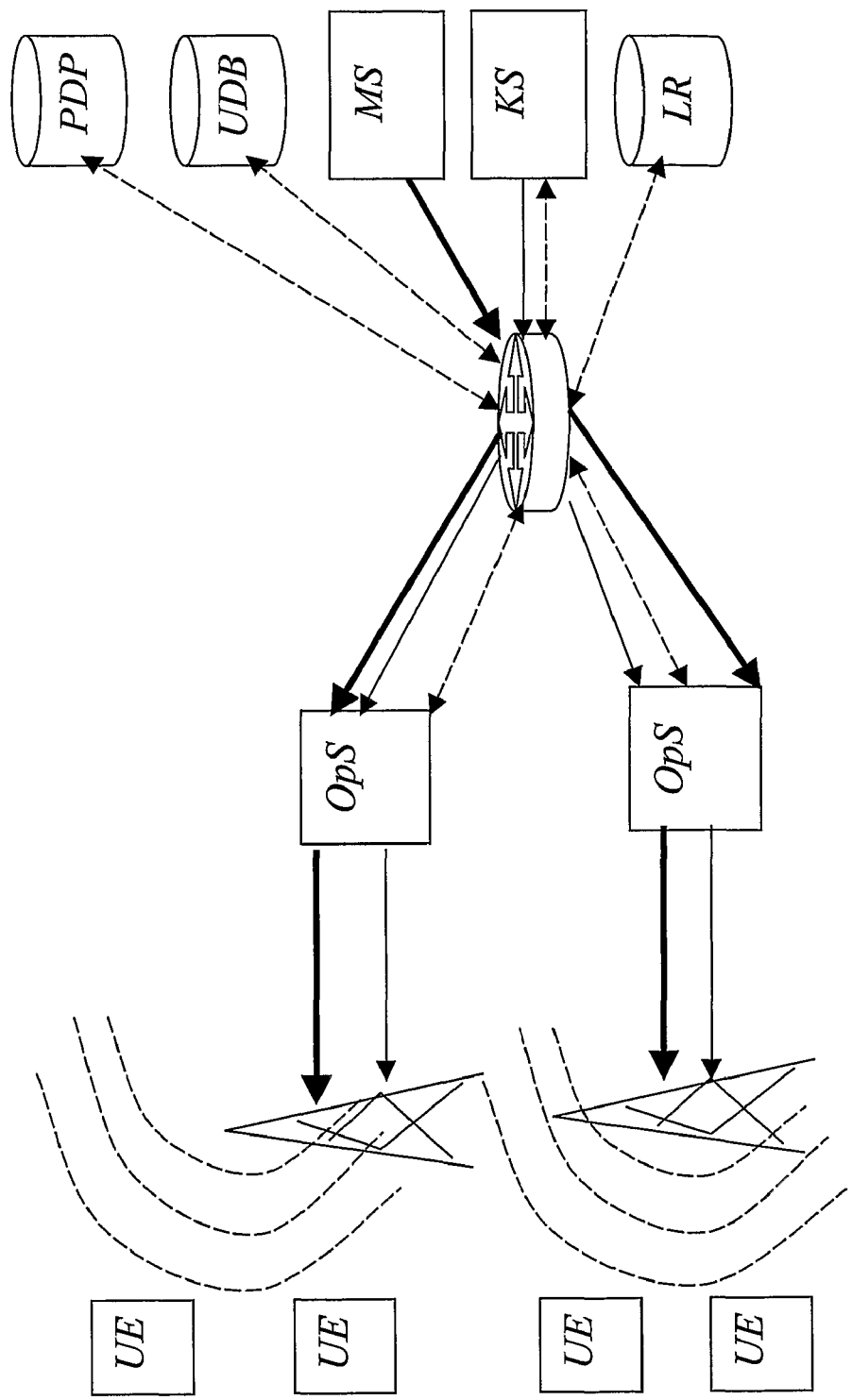
FIG. 8 is an overview illustration of an exemplary system setting in which one or more optimization servers according to an embodiment of the invention can be utilized.

The filtering may also use other criteria than mentioned above. For example, the OpS server may be aware of the capability of a user terminal to process the broadcasted content. The capability can e.g. relate to computing capacity of end user device, availability at end user device of specific decoders. Other factors can relate to user preferences, user priorities, and user location. Further, the OpS server may be aware of radio link properties such as available bandwidth, error rate, delay and other factors related to the quality of the radio link. Thus, the OpS server may exclude certain users from the broadcast from a user perspective to avoid reception of unacceptable quality or from a network perspective to save bandwidth. As basis for such exclusion the OpS server compiles necessary information from various sources, such as media server statistics collected through the RTCP (Real-time Transport Control Protocol), or other network monitoring nodes like state-full packet inspector nodes, media gateways, and firewalls. Generally, therefore, the OpS server interacts with several network entities as is illustrated in FIG. 8. A media server (MS), for sending the protected data to the users, provides information related to characteristics of the media that is broadcast. A location register (LR) provides user location data. A user database (UDB) provides information on user preferences and user profiles. The UDB may also register a mapping between users and the identifiers $U_{ij}$. However, instead of interacting with each such source directly, the interaction would preferably be done indirectly through a policy decision point (PDP) that collects information from the various sources. Based on the collected information a decision is made what current policies the OpS should apply at a given moment. The policy decision point (PDP) provides dynamic and static policies regarding the group-key distribution and media data relating, e.g., to traffic shaping and temporarily blocking of traffic. The policies can also be set on a per user basis.

Figure 10:
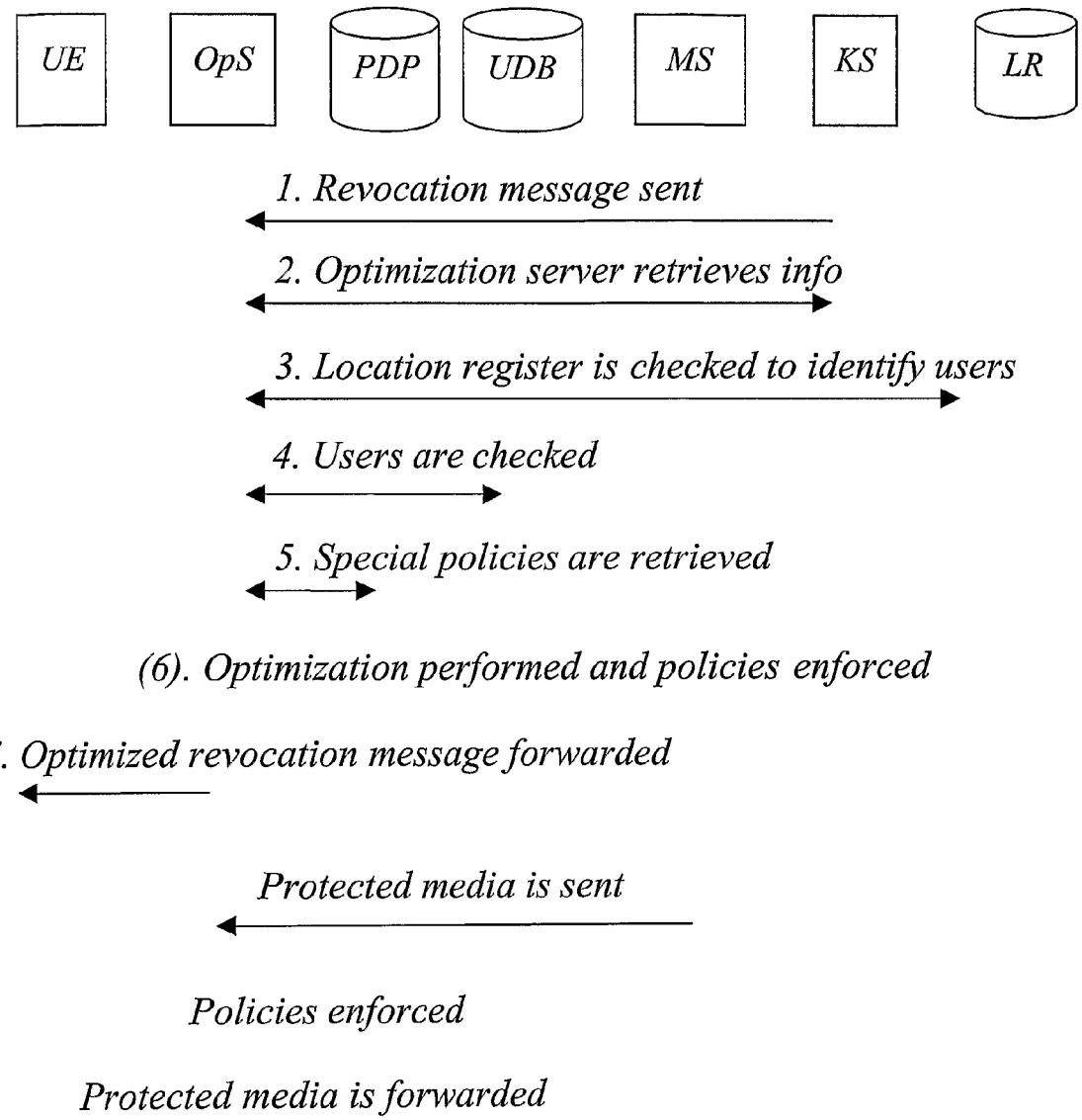
FIG. 10 is a signal diagram illustrating exemplary signaling between an optimization server according to an embodiment of the invention and other network entities.

FIG. 10 shows an exemplary signal diagram according to the invention. The key server (KS) transmits a group key management message at (1) that is intercepted by the OpS server for processing. If the group key management message belongs to a group-key distribution service that is not known to the OpS, the OpS contacts the key server (KS) at (2) to retrieve information about the group of members, the type of group-key distribution protocol including its logical structure. If the group-key distribution service is known the message (2) can be omitted. The location register (LR) is contacted at (3) with a request to identify the users that the specific OpS are handling. Note that the list of users it receives may include more users than the particular members in the group in case the request refers to all users that may be handled. Any user not in the group is ignored. The contact with the location register (LR) is made regularly to ensure that users who move around in the system and new users may be added or removed from particular OpS. At (4) OpS contacts the UDB to get information about the users in the group and the mapping between them and the identifiers $U_{ij}$ used in the group key management message. At (5) special policies are retrieved from the PDP. These policies are usually dynamic policies that are updated continuously. Dynamic policies are dependent on the situation and may change over time. For example, between times x and y radio link A should not receive messages larger than z KB given that the number of users is y. A static policy is something that is "hard coded" in the OpS, e.g. indicating acceptance of group-key distribution services from node Z only. At (6) the message is optimized using a user aware optimization method, e.g. as described above. Special policies can also be enforced. At (7) the optimized group key management message is transmitted towards the users (UE). At (8) the media server (MS) sends the protected media. The OpS server may act as a policy enforcement point for the media traffic as such, e.g. to shape or block traffic prior to forwarding at (9) the media to the users (UE). Further network entities can be included in the signaling according to FIG. 10, e.g. to make the subset R dependent on network configuration parameters. Exemplary, a subset R can be restricted to members located in a certain location area of a mobile network. In this case, referring to FIG. 11, the Ops server is preferably located in the RNC node. Alternatively, the subset R is made dependent on terminal and/or wireless channel capabilities and the subset R may be restricted to member terminals having capability to process a certain media format or to those member terminals having a radio access of specified capacity or quality.

Figure 12:
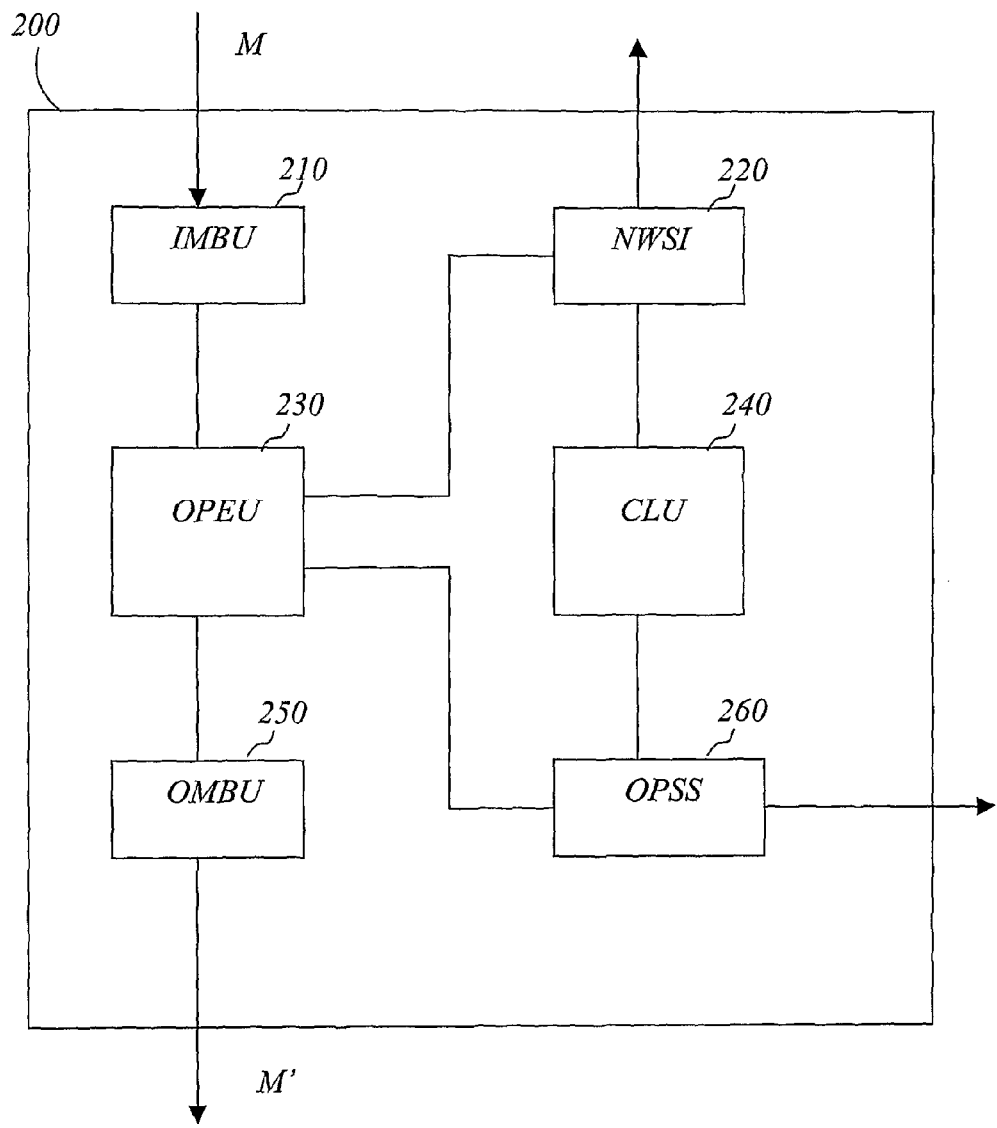
FIG. 12 is a block diagram of an exemplary optimization server according to a preferred embodiment of the invention.

An exemplary structure of a preferred OpS server is shown in FIG. 12. An input message buffer unit (IMBU) receives from the key server (KS) a key message (M). The message is forwarded to an optimization and policy enforcement unit (OPEU). The OPEU unit performs optimization in dependence of information received from various network units over the network-signaling interface (NWSI). A modified message (M') is stored in the output message buffer unit (OMBU) for further broadcast to the users. A control unit (CLU) controls the processes within the optimization server. Another signaling interface (OPSS) handles signaling between different optimization servers. This can be useful e.g. when a user moves from one cell controlled by a first optimization server to another cell controlled by a second optimization server. Exemplary, referring to FIG. 9, user UE1 may move from the cell controlled by OpS2 to the cell controlled by OpS3. The optimization server OpS2 may then modify the message $M_2$ correspondingly and signal to OpS3 to modify the message $M_3$.

The invention, in all its aspects, is generally applicable to broadcast and multicast, both wireless, wire line and combinations, including e.g. not only radio-based broadcast but also Internet service applications.

The embodiments described above are merely given as examples, and it should be understood that the present invention is not limited thereto. Further modifications, changes and improvements, which retain the basic underlying principles disclosed and claimed herein, are within the scope of the invention.

REFERENCES

[1] International Patent Application WO-200260116 (LOTSPIECH J B; NAOR D; NAOR S).
[2] *Probabilistic Optimization of LKH-based Multicast Key Distribution Schemes*, A. Selcuk et al., Internet draft January 2000, http://www.securemulticast.org/draft-selcuk-probabilistic-lkh-00.txt.
[3] *Secure Group Communications Using Key Graphs*, C. K. Wong et al. http://www.cs.utexas.edu/users/lam/Vita/ACMIWGL98.pdf.
[4] *A Reliable Key Authentication Scheme for Secure Multicast Communications*, R. Di Pietro et al., http://cesare.dsi.uniroma1.it/Sicurezza/doc/srds2003.pdf.
[5] U.S. Pat. No. 5,748,736.
[6] *Key Management for Secure Multicast Group Communication in Mobile Networks*, T. Kostas et al., http://nevelex.com/downloads/discex.pdf.

What is claimed is:

1. A method for improving a hierarchical group key distribution protocol in which a group key management message, comprising identifiable message elements, is broadcast to a group of receivers for determining a media decryption key, comprising the steps of:
    establishing a top-level key for media protection;
    encrypting the top-level key under an output key of the hierarchical group key distribution protocol;
    applying an authentication signature on at least the encrypted top-level key;
    generating a modified group key management message by adding the encrypted top-level key and the authentication signature to the group key management message; and,
    broadcasting the modified group key management message to each member of the group of receivers.

2. The method of claim 1, wherein said encrypted top-level key and said authentication signature are included in a common message element in the modified group key management message.

3. The method of claim 1, wherein said encrypted top-level key and said authentication signature are included in different message elements in the modified group key management message.

4. The method according to claim 1, further comprising the steps of:
    generating a verification tag to enable verification of the correctness of the top-level key; and
    further adding the verification tag to said group key management message.

5. The method according to claim 1, wherein the step of encrypting uses an encryption key that is derived from the output key of the group-key distribution protocol.

6. The method of claim 5, wherein the derivation is based on a one-way function.

7. The method of claim 4, wherein said verification tag comprises a check sum and said step of adding the verification tag to said group key management message comprises concatenating the checksum to the encrypted top-level key.

8. The method of claim 4, wherein said verification tag comprises a MAC code calculated over the encrypted top-level key and said step of adding the verification tag to said group key management message comprises concatenating said MAC code to the encrypted top-level key.

9. The method of claim 8, wherein said MAC code is calculated using a key derived from the output key of the group-key distribution protocol.

10. The method of claim 1, wherein said protocol is the logical key hierarchy protocol (LKH), the subset difference protocol (SD), or the layered subset difference protocol (LSD).

11. The method of claim 1, wherein prior to the step of broadcasting, an optimization of the message is carried out comprising the further steps of:
    identifying those elements in said group key management message that are required by a given sub-group of receivers for determining a media key;
    creating a modified group key management message by excluding those elements that are not required by the given sub-group of receivers; and
    broadcasting the modified group key management message.

12. The method of claim 11, wherein the broadcasting is made within a specified area in a cellular radio system and the step of identifying is made in relation to a sub-group of receivers within said specified area.

13. The method of claim 11, wherein said group is further restricted to receivers who can receive said media at a pre-specified quality.

14. The method of claim 13, wherein said quality relates to at least one transmission link quality.

15. An apparatus adapted to improve a hierarchical group-key distribution protocol in which a group key management message, comprising identifiable message elements, is broadcast to a group of receivers, comprising:
    means for establishing a top-level key for media protection;
    means for encrypting the top-level key under an output key of the hierarchical group-key distribution protocol;
    means for applying an authentication signature on at least the encrypted top-level key;
    means for generating a modified group key management message by adding the encrypted top-level key with the authentication signature to the group key management message; and,
    means for broadcasting the modified group key management message to each member of the group of receivers.

16. The apparatus according to claim 15, further comprising:
    means for generating a verification tag to enable verification of the correctness of the top-level key; and
    means for adding the verification tag to the group key management message.

17. The apparatus according to claim 15, wherein said means for encrypting operates based on an encryption key that is derived from the output key of the group-key distribution protocol.

18. The apparatus of claim 15, further comprising:
means for identifying those elements in said group key management message that are required by a given sub-group of said group members for determining a media key;
means for creating an optimized group key management message by excluding those message elements that are not required by the given sub-group;
means for broadcasting the optimized group key management message.

19. The apparatus according to claim 15, wherein said apparatus is implemented in a key server.

20. The apparatus according to claim 15, wherein said apparatus is implemented in a network node.

21. An apparatus for optimizing a group-key management message comprising identifiable message elements, comprising:
means for receiving a group key management message M;
means for modifying the group key management message according to given optimization rules to filter away a number of said message elements; and
means for output of the modified group key management message;
wherein said group key management message is originally related to a group of receivers in a communication network, and said means for modifying the group key management message comprises:
means for identifying those elements in said group key management message that are required by a given sub-group of said receivers for determining a group key; and,
means for creating the modified group key management message by excluding those elements that are not required by the given sub-group.

22. The apparatus according to claim 21, wherein said means for identifying those elements in said group key management message that are required by a given sub-group operates based on information about which group-key distribution protocol that is used including its logical structure as well as a list of receivers currently in the given sub-group.

23. The apparatus according to claim 22, wherein said group-key distribution protocol information and said list of receivers are obtained from at least one network element in a communication network.

24. The apparatus according to claim 21, wherein broadcasting is made within a specified area in a cellular radio system and the given sub-group of receivers is defined as those receivers that are currently within said specified area.

25. The apparatus according to claim 21 wherein said message is originally directed to a group N of users, wherein said group-key management message has the form:

$$M=\{U_{ij}, E(H_{Uij}, \hat{H}_{Uij}) \ldots U_{kl}, E(H_{Ukl}, \hat{H}_{Ukl}), \ldots \},$$

where $U_{ij}$ is a compound index identifier that depends on the hierarchical group key distribution protocol used, $H_{Uij}$ is an encryption key used in the encryption function E, and $\hat{H}_{Uij}$, depending on the group key distribution protocol, is the final output key or encryptions of the next encryption key corresponding to the levels in the hierarchical protocol, and said optimization comprises deleting those elements $E(H_{Uij}, \hat{H}_{Uij})$ that are not relevant for a sub-group of users $R \subset N$.

26. The apparatus according to claim 21, wherein said apparatus is located at a Radio Network Controller (RNC), Radio Base Station (RBS), Serving GPRS Support Node (SGSN), Gateway GPRS Support Node (GGSN), Border Gateway or a personal proxy.

* * * * *

UNITED STATES PATENT AND TRADEMARK OFFICE
CERTIFICATE OF CORRECTION

PATENT NO. : 8,175,278 B2
APPLICATION NO. : 11/568648
DATED : May 8, 2012
INVENTOR(S) : Johansson et al.

Page 1 of 1

It is certified that error appears in the above-identified patent and that said Letters Patent is hereby corrected as shown below:

On the title page, item (75), under "Inventors", in Column 1, Line 2, delete "Alvsjo" and insert -- Älvsjö --, therefor.

On Page 2, item (56), under "OTHER PUBLICATIONS", in Column 2, Line 10, delete "ProbabilisticOptimization" and insert -- Probabilistic Optimization --, therefor.

On Page 2, item (56), under "OTHER PUBLICATIONS", in Column 2, Line 14, delete "/Iam/" and insert -- /lam/ --, therefor.

On Page 2, item (56), under "OTHER PUBLICATIONS", in Column 2, Line 15, delete "KeyAuthentication" and insert -- Key Authentication --, therefor.

In Column 9, Line 24, delete "Sign [{E(H, $K_S$+f($K_S$))]}," and insert -- Sign [E(H, $K_S$+f($K_S$))]}, --, therefor.

In Column 13, Line 28, delete "ACMIWGL98.pdf." and insert -- ACM/WGL98.pdf. --, therefor.

Signed and Sealed this
Twenty-third Day of October, 2012

David J. Kappos
*Director of the United States Patent and Trademark Office*